US009859833B1

(12) United States Patent
Cook

(10) Patent No.: US 9,859,833 B1
(45) Date of Patent: Jan. 2, 2018

(54) FIXED AND VARIABLE SPEED INDUCTION MOTOR AND LIGHT CONTROLLER

(71) Applicant: William V. Cook, Winter Haven, FL (US)

(72) Inventor: William V. Cook, Winter Haven, FL (US)

(*) Notice: Subject to any disclaimer, the term of this patent is extended or adjusted under 35 U.S.C. 154(b) by 0 days.

(21) Appl. No.: 15/261,861

(22) Filed: Sep. 9, 2016

(51) Int. Cl.
*H02P 25/02* (2016.01)
*H02P 27/08* (2006.01)
*H05B 37/02* (2006.01)

(52) U.S. Cl.
CPC .............. *H02P 25/02* (2013.01); *H02P 27/08* (2013.01); *H05B 37/0272* (2013.01)

(58) Field of Classification Search
CPC ............ H05B 37/0272; H05B 33/0845; H05B 33/0815; H05B 33/0884; H05B 37/02; H05B 37/0254; H05B 37/0263; H05B 39/041; H05B 39/044; Y02B 20/347; Y10T 307/753; H02P 27/085
USPC ............ 340/825.57; 417/44.1; 315/301, 302, 315/299, 307, 208, 291, 394, 362, 224, 315/295, 297
See application file for complete search history.

(56) References Cited

U.S. PATENT DOCUMENTS

| 4,719,446 A | 1/1988 | Hart | |
|---|---|---|---|
| 5,041,825 A * | 8/1991 | Hart | G08C 17/02 318/16 |
| 5,187,472 A * | 2/1993 | Hart | G08C 17/02 340/12.5 |
| 5,365,154 A * | 11/1994 | Schneider | G05B 19/0423 307/115 |
| 5,541,584 A * | 7/1996 | Mehta | H02J 13/0048 340/12.32 |
| 5,689,261 A | 11/1997 | Mehta et al. | |
| 5,789,894 A | 8/1998 | Neiger et al. | |
| 6,010,310 A * | 1/2000 | MacBeth | H02P 29/50 417/22 |
| 6,075,329 A | 6/2000 | Liao et al. | |
| 6,120,262 A | 9/2000 | McDonough et al. | |
| 8,068,014 B2 * | 11/2011 | Steiner | H04B 3/54 340/12.38 |
| 9,301,371 B2 * | 3/2016 | Steiner | H05B 37/0254 |
| 2006/0273751 A1 * | 12/2006 | DeJonge | H02P 25/04 318/772 |
| 2007/0019934 A1 * | 1/2007 | Ku | H02P 7/29 388/811 |

(Continued)

OTHER PUBLICATIONS

C. Medina, "Ceiling Fan Speed Control" Freescale Semiconductor (2008), 24 pages.

*Primary Examiner* — Daniel Kessie
(74) *Attorney, Agent, or Firm* — Richard C. Litman

(57) ABSTRACT

The fixed and variable speed induction motor and light controller has a dual isolated low voltage power supply including timing control that utilizes the zero crossing detector of a microcontroller (MCU) to chop the voltage. This permits quiet on the fly variable speed control. The MCU is connected to a pulse width modulation (PWM) module including two pairs of MOSFETs connected back-to-back to form two AC switches for motor control. A TRIAC phase control output controls the lighting. A reverse switch (which may be a part of the existing ceiling fan) or an on-board reverse relay is included. An RF receiver (WiFi, Bluetooth, etc.) is configured for remote access to the controller.

4 Claims, 6 Drawing Sheets

(56) References Cited

U.S. PATENT DOCUMENTS

| | | | |
|---|---|---|---|
| 2007/0247091 A1* | 10/2007 | Maiocchi | H02M 3/156 318/400.04 |
| 2010/0290260 A1 | 11/2010 | Wang | |
| 2010/0308027 A1* | 12/2010 | Vogel | B23K 9/0953 219/130.21 |
| 2013/0043814 A1 | 2/2013 | Chuah et al. | |
| 2015/0004022 A1 | 1/2015 | Noble | |
| 2016/0353555 A1* | 12/2016 | Chen | H05B 37/0272 |

* cited by examiner

FIXED AND VARIABLE SPEED INDUCTION MOTOR AND LIGHT CONTROLLER

BACKGROUND OF THE INVENTION

1. Field of the Invention

The present invention relates to motor and lighting control circuitry, primarily for use in ceiling fans, and particularly to a fixed and variable speed induction motor and light controller that includes motor and lighting solid-state control circuitry.

2. Description of the Related Art

Current state of the art fan speed controllers utilize a switched impedance to control high/medium/low speed settings, generally using large AC capacitors. Such a switching scheme introduces undesirable hum in induction motors.

Thus, a fixed and variable speed induction motor and light controller solving the aforementioned problems is desired.

SUMMARY OF THE INVENTION

The fixed and variable speed induction motor and light controller has a dual isolated low voltage power supply including timing control that utilizes the zero crossing detector of a microcontroller (MCU) to chop the voltage. This permits quiet on the fly continuously variable speed control, rather than discrete speed settings.

The motor controller includes two AC switches, one to interrupt line voltage to the fan, the other to recirculate inductive current from the motor windings when line voltage to the fans is interrupted. Each AC switch may be a pair of MOSFETs connected back to back. The gate voltage for each MOSFET is provided by a 250 kHz square wave at 50% duty cycle generated by the MCU, which is fed to a 1:1:1 isolation transformer, followed by a voltage doubler. This switching arrangement reduces or eliminates power supply hum typically encountered by conventional ceiling fan controllers, since the present controller does not use large capacitors.

A TRIAC phase control output is used to provide a dimmer circuit for the ceiling fan light. The current or power for the dimmer circuit is continuously monitored, and the MCU is configured to limit power to about 200 W so that if the user puts in a bulb having the wrong wattage, power is automatically reduced to protect the ceiling light fixture.

The circuitry may be provided on a printed circuit board enclosed in a housing. The circuitry may include a Bluetooth® or WiFi module so that the motor and lighting circuits may be adjusted by the user by remote control.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fixed and variable speed induction motor and light controller 100 (shown in FIG. 1) has a dual isolated low voltage power supply including timing control that utilizes the zero crossing detector of an MCU to chop the voltage. This permits quiet on the fly variable speed control.

Figure 1:
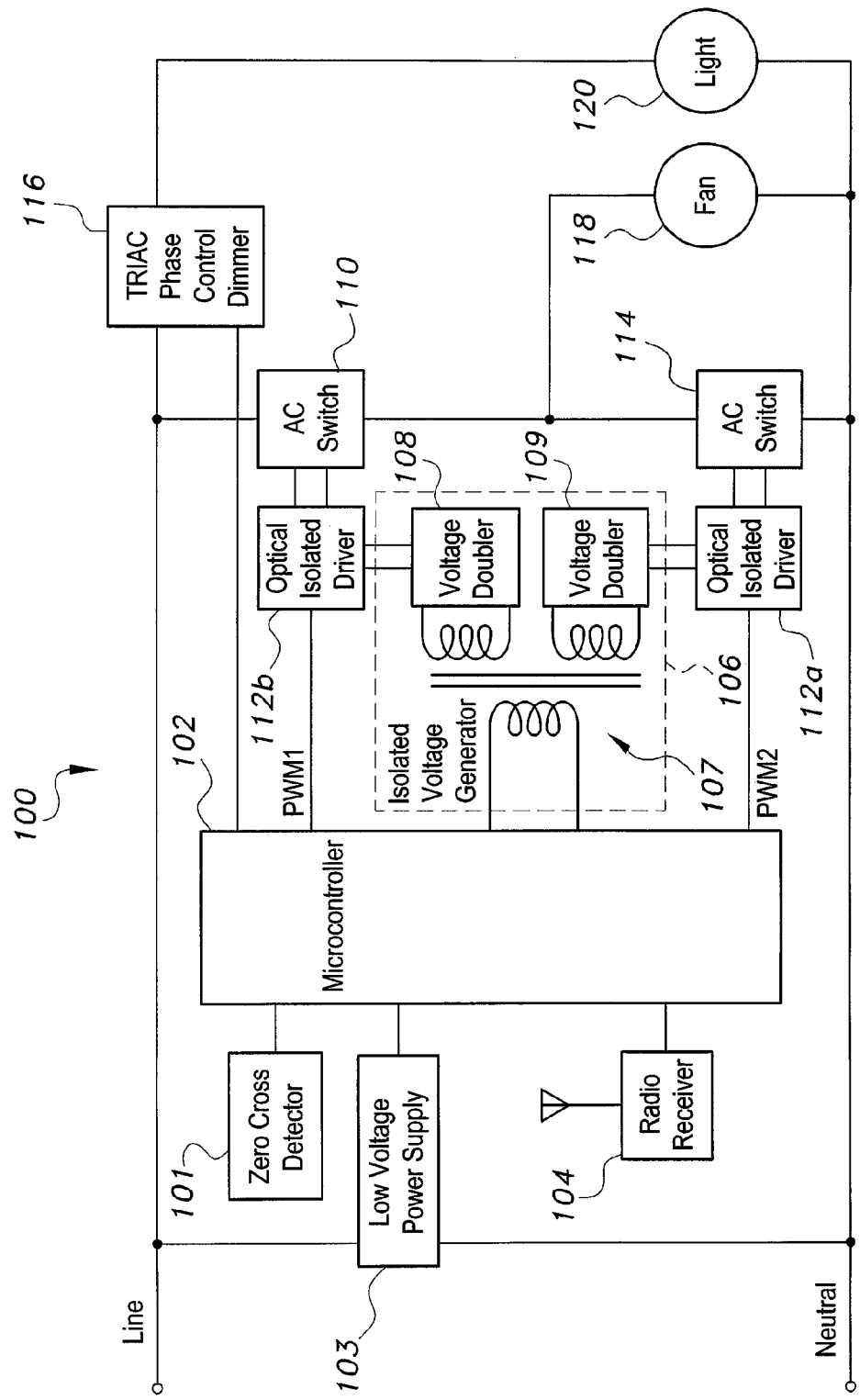
FIG. 1 is a block diagram of a fixed and variable speed induction motor and light controller according to the present invention.
Figure 2A:
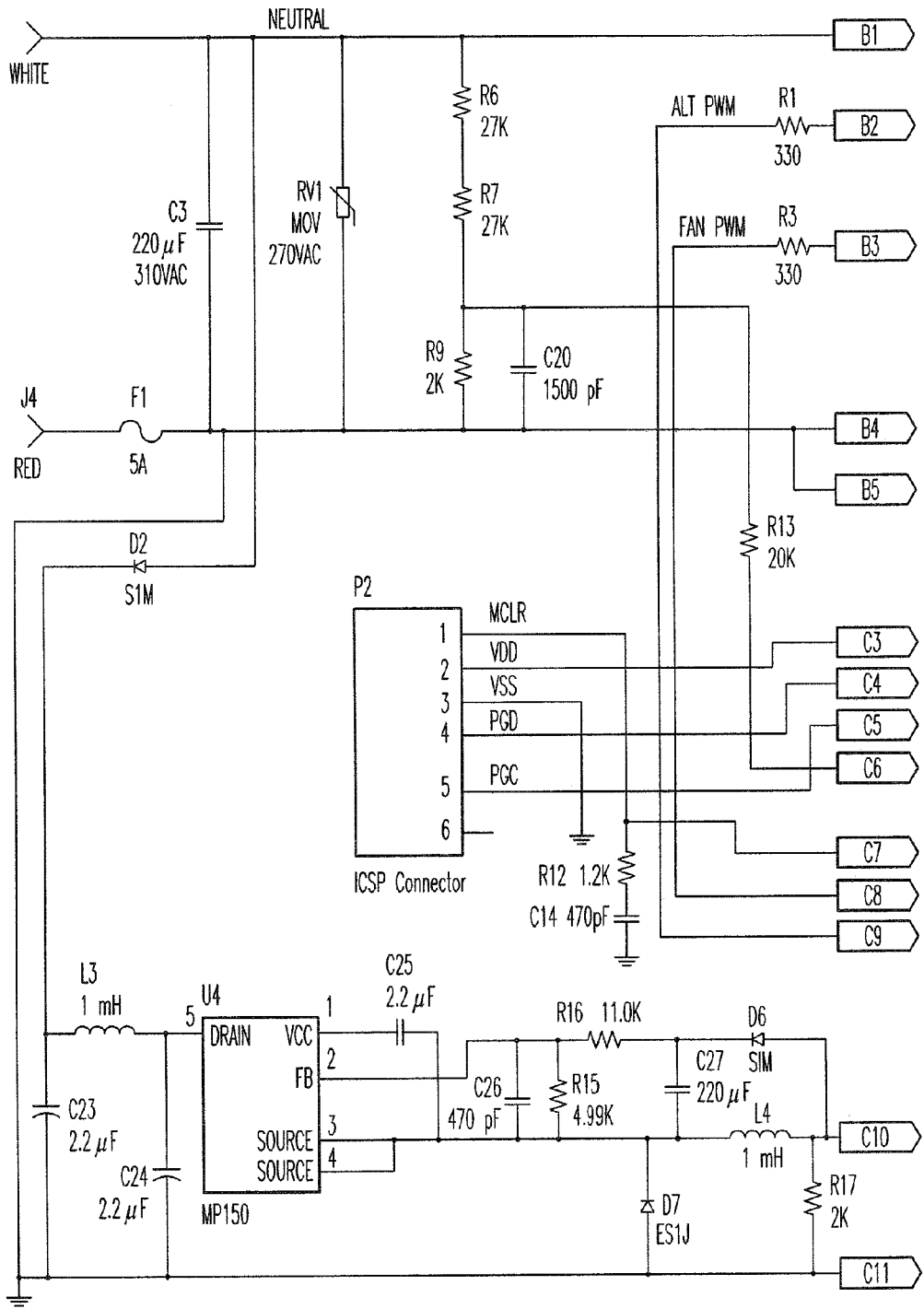
FIGS. 2A, 2B, 2C, and 2D, taken together, are a schematic diagram of the circuitry of a fixed and variable speed induction motor and light controller according to the present invention.
Figure 2B:
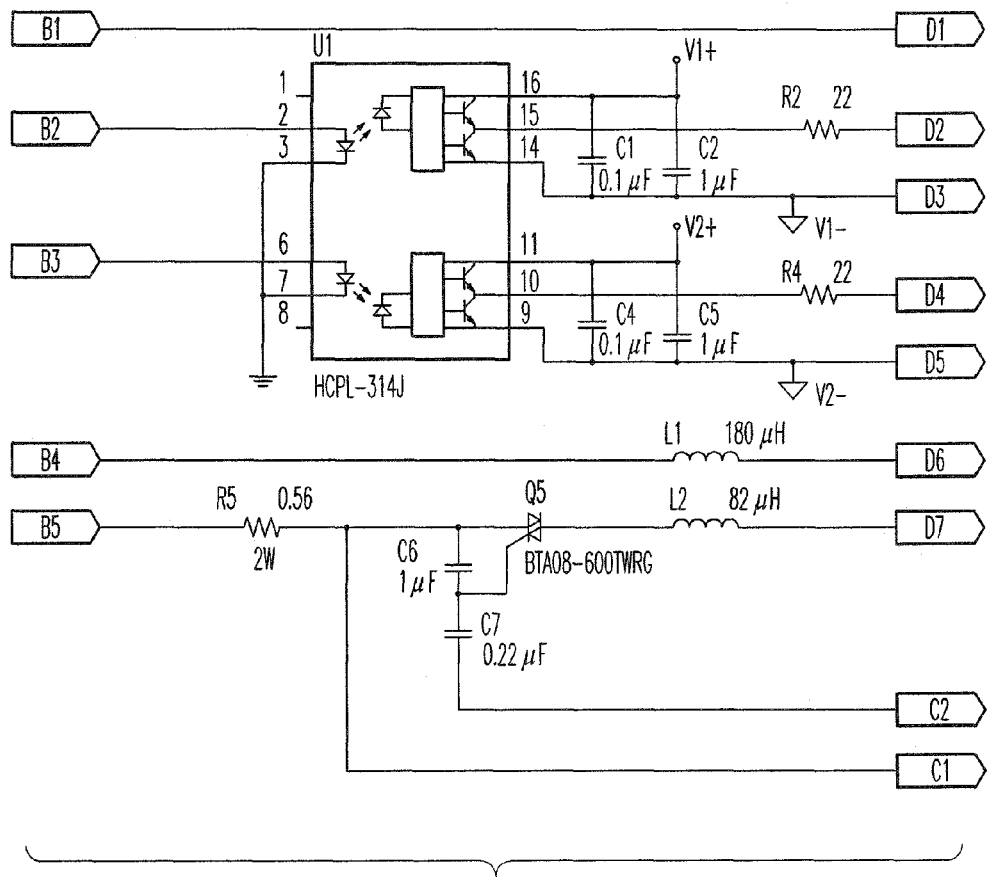
Figure 2C:
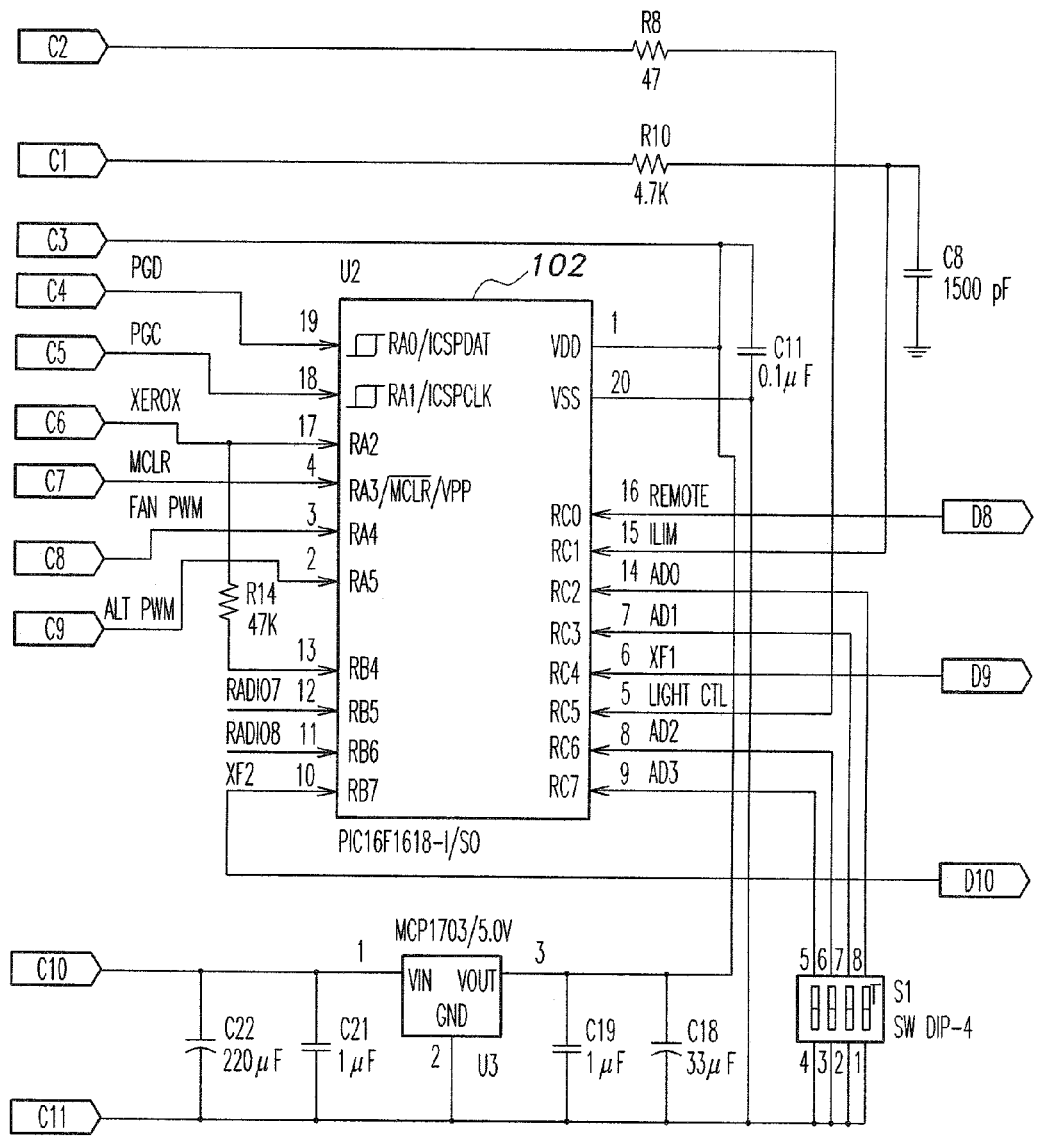
Figure 2D:
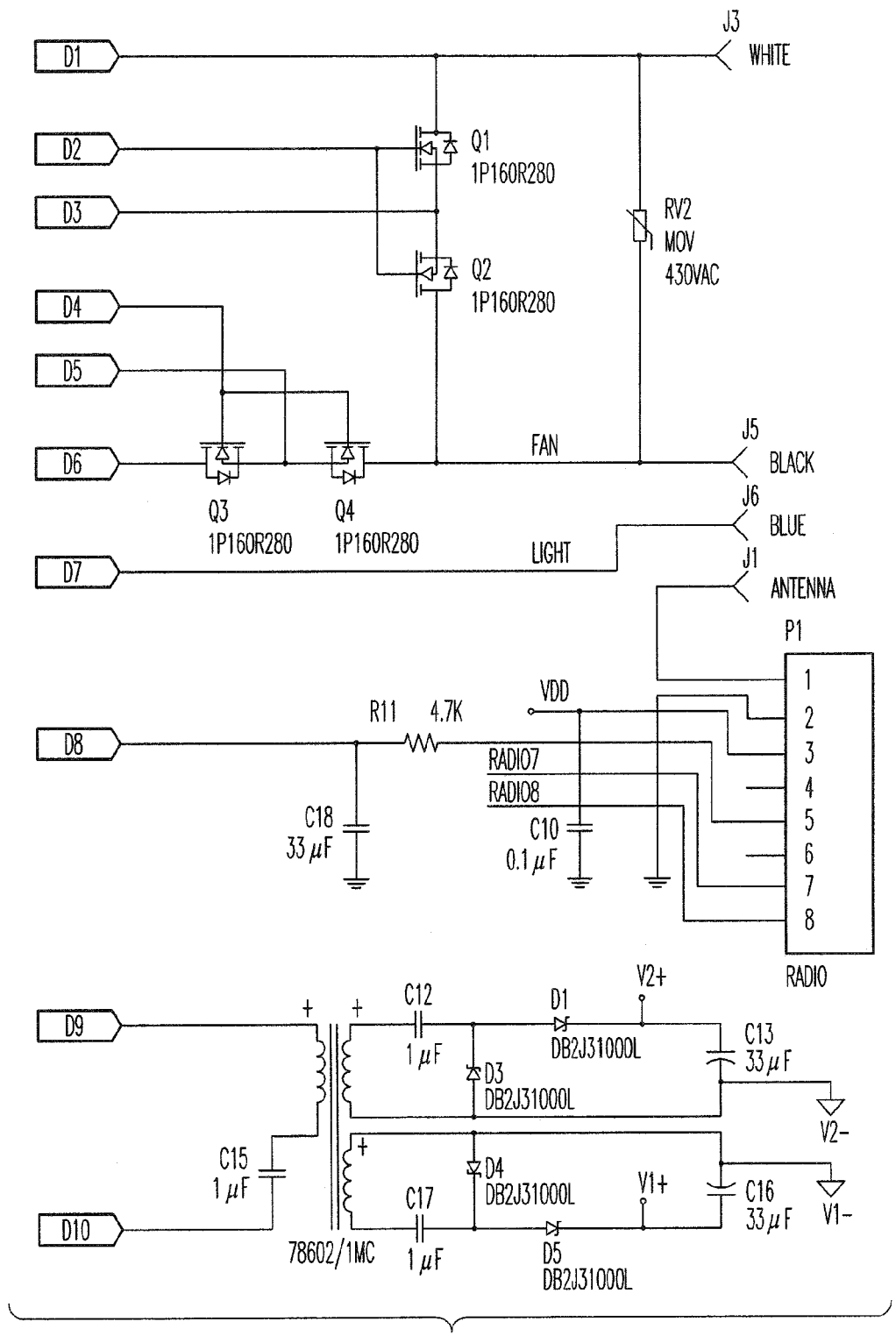
Figure 3:
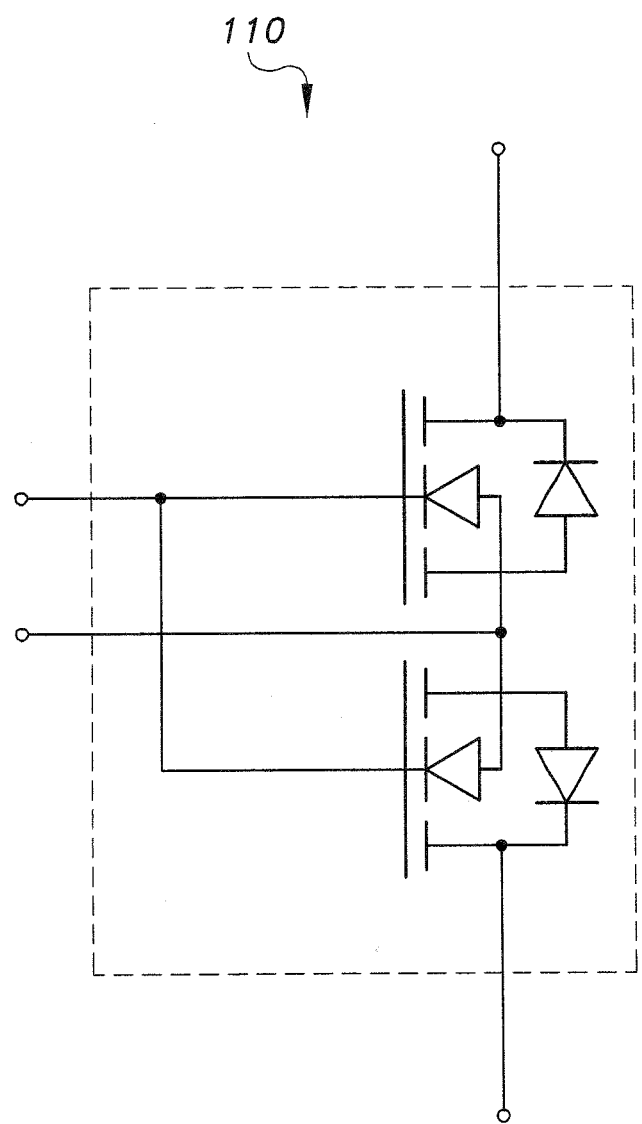
FIG. 3 is a circuit diagram of an AC switch for a fixed and variable speed induction motor and light controller according to the present invention.

As shown in FIG. 1, a microcontroller 102, also referred to as a micro control unit (MCU), provides a pulse width modulation (PWM 1) output (a 250 kHz square wave at 50% duty cycle; the fan motor speed is continuously variable by changing the duty cycle of the PWM output) that feeds an optical isolated driver 112b, which, in turn, feeds a first AC switch 110. Similarly, a second AC switch 114 (having the same circuit configuration as AC switch 110) is controlled via connection of optical isolated driver 112a, which is fed by the PWM2 output from microcontroller 102. The switches 110, 114 are controlled by the microcontroller's zero crossing detector 101 so that each switch is enabled for one-half the cycle of the AC line voltage. When the first switch 110 is disabled, line voltage is cut off from the fan 118 (or the fan's motor) and the second switch 114 is enabled to permit recirculating current from the fan's coils by back or counter electromotive force (EMF) to keep the fan 118 operating. The driven voltage is via the PWM output through an isolation unit 106 that includes a 1:1:1 transformer 107 followed by voltage doubler circuitry 108, 109 corresponding to each secondary coil of the transformer 107, the output of the voltage doublers 108, 109 being coupled to the AC switches 110, 114 by corresponding optoisolators 112a, 112b. Each AC switch 110, 114 may comprise two MOSFETs connected back-to-back (gate-to-gate and drain-to-drain, as shown in FIG. 3) for control of the fan motor 118. The switches could also be formed with back-to-back IGBTs or other technologies. The two AC switches 110, 114 alternately apply line power to the fan and then shunt the fan motor to allow recirculating currents from the inductive load. This switching arrangement allows the device to dissipate counter electromotive force (CEMF), or freewheeling current, by shorting (shunting) two of the four PWM controlled MOSFETs across the motor every cycle to prevent a surge back into the controller 102. The MOSFETs require an isolated voltage referenced to the source pins to drive the gates. Since neither set of MOSFET sources are referenced to anything else in the circuit, the two independent isolated supplies coupled by optoisolators 112a, 112b are required. The isolated voltages are generated with a small 1:1:1 gate drive transformer 107 driven by the microcontroller at 250 KHz. The transformer 107 generates two isolated AC voltages at about the same level as the microcontroller voltage. The MOSFET gates require a higher DC voltage, so the gate drive transformer secondaries are followed with voltage doubler circuits 108 and 109, which provide the needed voltages. The microcontroller 102 generates complementary drive signals for the AC switches 110, 114, the duty cycle of which corresponds to the requested fan speed. These signals are isolated by optical couplers 112a and 112b connected to the AC switches 110 and 114 using the isolated voltages generated by the transformer/doubler circuitry 108, 109. Additionally, the microcontroller 102 monitors the power line phase, and uses that to control a conventional TRIAC phase control dimmer circuit 116 to dim the light 120 in the ceiling fan 118.

The microcontroller 102 and controller 100 are energized by a low voltage power supply 103. A reverse switch (which may be a part of the existing ceiling fan) or an on-board reverse relay can be included. An RF (WiFi, Bluetooth, etc.) receiver 104 is also connected to microcontroller 102 and is configured for remote access to the controller 102. The remote control can determine the speed and dimming settings for the attached ceiling fan 118 and light 120, but local control could be added easily as well. FIGS. 2A through 2D show details of the circuitry of the fixed and variable speed induction motor and light controller 100. The microcontroller 102 and radio receiver 104 require a DC supply voltage on the order of 3V to 5V, so the small power supply 103 is required to generate that voltage from the AC power line.

It is to be understood that the present invention is not limited to the embodiments described above, but encompasses any and all embodiments within the scope of the following claims.

I claim:

1. A fixed and variable speed induction motor and light controller, comprising:
   a microcontroller (MCU);
   a radio receiver connected to the MCU for relaying remote control commands to the MCU;
   a TRIAC phase control dimmer circuit connected to the microcontroller, the TRIAC phase control dimmer circuit having a variable output for dimming a light connected to the variable output; a voltage generator circuit connected to pulse width modulation (PWM) outputs of the MCU, the voltage generator circuit having a pulse width modulated (PWM) output;
   wherein PWM output of the voltage generator circuit being responsive to the remote control commands selectively controls speed of a fan in operable communication with the PWM output;
   a first AC switch;
   a first opto-isolator circuit connected to the first AC switch, the first opto-isolator circuit and the first AC switch being disposed between the PWM output of the voltage generator circuit and the operably communicating fan;
   a second AC switch; and
   a second opto-isolator circuit connected to the second AC switch, the second opto-isolator circuit and second AC switch in combination being disposed between the PWM output of the voltage generator circuit and leads of the operably communicating fan to selectively short the fan;
   wherein the MCU has a zero crossing detector module adapted for connection to AC supply lines connected to the fan, the microcontroller alternately connecting the first switch in series with the fan and for disconnecting the first switch and connecting the second switch in shunt across the fan when zero crossing of the AC supply is detected to alternately power a motor of the fan with line voltage and with back EMF from the fan motor during each cycle of the AC supply.

2. The fixed and variable speed induction motor and light controller according to claim 1, wherein the voltage generator comprises:
   a 1:1:1 isolation transformer having a primary winding and first and second secondary windings, the primary winding being connected to the MCU; and
   first and second voltage doublers connected to the first secondary winding and the second secondary winding, respectively, the first voltage doubler being connected to the first opto-isolator circuit and the second voltage doubler being connected to the second opto-isolator circuit.

3. The fixed and variable speed induction motor and light controller according to claim 2, further comprising a low voltage power supply connected to said microcontroller.

4. The fixed and variable speed induction motor and light controller according to claim 3, wherein said first AC switch and said second AC switch each comprise two MOSFETs connected back to back.

* * * * *